(12) United States Patent
Petters et al.

(10) Patent No.: US 8,756,944 B2
(45) Date of Patent: Jun. 24, 2014

(54) MEANS, METHOD AND SYSTEM FOR HEAT EXCHANGE

(75) Inventors: Stefan Petters, Vienna (AT); Ka Chun Tse, Tiu Keng Leng (HK)

(73) Assignee: Bestrong International Limited, Wanchai (HK)

(*) Notice: Subject to any disclaimer, the term of this patent is extended or adjusted under 35 U.S.C. 154(b) by 79 days.

(21) Appl. No.: 13/521,289

(22) PCT Filed: Feb. 24, 2011

(86) PCT No.: PCT/CN2011/071242
§ 371 (c)(1),
(2), (4) Date: Jul. 10, 2012

(87) PCT Pub. No.: WO2011/124104
PCT Pub. Date: Oct. 13, 2011

(65) Prior Publication Data
US 2012/0298332 A1 Nov. 29, 2012

(30) Foreign Application Priority Data

Apr. 7, 2010 (AT) .................................. GM226/2010
Jul. 30, 2010 (HK) .................................. 10107293.7

(51) Int. Cl.
*F25D 17/06* (2006.01)
(52) U.S. Cl.
USPC ................................................. 62/94; 62/478
(58) Field of Classification Search
CPC .......... F24F 3/14; F25B 17/04; F25B 17/083; F25B 15/00; F25B 17/00; F25B 37/00
USPC ......... 62/94, 476, 478, 479, 486; 165/104.11, 165/104.13; 29/890.03
See application file for complete search history.

(56) References Cited

U.S. PATENT DOCUMENTS

| 3,593,540 A * | 7/1971 | Hopkins ......................... 62/476 |
| 3,907,025 A * | 9/1975 | Malcosky et al. ................ 165/63 |
| 4,415,023 A * | 11/1983 | Vandervaart ................... 165/122 |
| 5,085,271 A * | 2/1992 | Yanadori et al. .......... 165/104.12 |
| 5,157,942 A * | 10/1992 | Dao ................................ 62/476 |
| 5,282,507 A * | 2/1994 | Tongu et al. ................... 165/165 |
| 5,325,683 A * | 7/1994 | Yamamoto et al. ............. 62/476 |

(Continued)

FOREIGN PATENT DOCUMENTS

| CN | 101476830 A | 7/2009 |
| DE | 2238045 | 2/1973 |

(Continued)

*Primary Examiner* — Mohammad M Ali
(74) *Attorney, Agent, or Firm* — The Webb Law Firm

(57) ABSTRACT

A heat transfer device and its manufacturing method are provided. The heat transfer device has a heat transfer member defining a heat exchange surface with which a heat transportable medium contact in use and via which heat is transferable between the heat transportable medium and a working medium, and a device body for containing the heat transportable medium. The body of the device defines a first chamber, a second chamber and a third chamber which are in fluid communicable relationship. The body is configured to allow the heat transportable medium fluid to pass from the second chamber to the first chamber and then to the third chamber, or from the third chamber to the first chamber and then to the second chamber, and the second chamber is sandwiched or positioned between the first chamber and the third chamber in the body.

20 Claims, 8 Drawing Sheets

(56) References Cited

U.S. PATENT DOCUMENTS

| | | | | |
|---|---|---|---|---|
| 5,477,705 | A | * | 12/1995 | Meunier .................... 62/480 |
| 5,653,116 | A | * | 8/1997 | Erickson et al. ............. 62/101 |
| 5,901,572 | A | * | 5/1999 | Peiffer et al. ................ 62/480 |
| 5,916,258 | A | * | 6/1999 | Cho ............................ 62/476 |
| 5,943,874 | A | * | 8/1999 | Maeda ........................ 62/271 |
| 5,954,126 | A | | 9/1999 | Armbruster |
| 6,606,881 | B1 | * | 8/2003 | Justin .......................... 62/475 |
| 6,615,603 | B2 | * | 9/2003 | Tanaka et al. ............. 62/259.2 |
| 6,802,364 | B1 | * | 10/2004 | Garimella ................... 165/116 |
| 6,845,631 | B1 | * | 1/2005 | Hallin et al. ................. 62/476 |
| 7,003,966 | B2 | * | 2/2006 | Sharma et al. .............. 62/101 |
| 7,107,784 | B2 | * | 9/2006 | Beck ........................ 62/324.2 |
| 7,225,634 | B2 | * | 6/2007 | Inoue .......................... 62/476 |
| 2003/0061764 | A1 | * | 4/2003 | Benallal et al. ............. 48/198.7 |
| 2004/0002264 | A1 | * | 1/2004 | Yao ............................ 439/638 |
| 2004/0031592 | A1 | | 2/2004 | Mathias et al. |
| 2004/0164748 | A1 | * | 8/2004 | Chheda et al. ............... 324/649 |
| 2004/0199039 | A1 | | 10/2004 | Brophy et al. |
| 2008/0075611 | A1 | * | 3/2008 | Lai et al. ..................... 417/420 |
| 2008/0250811 | A1 | * | 10/2008 | Inoue et al. .................. 62/484 |
| 2008/0314574 | A1 | | 12/2008 | Filippi et al. |

FOREIGN PATENT DOCUMENTS

| | | |
|---|---|---|
| EP | 0498753 A2 | 1/1992 |
| EP | 0952913 A1 | 7/1998 |
| GB | 1395378 | 5/1975 |
| JP | 2001280866 A | 10/2001 |
| JP | 2001280888 A | 10/2001 |
| JP | 2007317374 A | 12/2007 |
| WO | 9102205 A1 | 2/1991 |
| WO | 9831529 A1 | 7/1998 |
| WO | 9900186 A1 | 1/1999 |
| WO | 2004042297 A2 | 5/2004 |

* cited by examiner

MEANS, METHOD AND SYSTEM FOR HEAT EXCHANGE

FIELD OF THE INVENTION

The present invention is concerned with but not limited to a heat transfer device or a heat exchanger for use in, for example, an absorption refrigeration system, a method of manufacturing such device, exchanger or system, a method of operating such device, exchanger or system, and a heat transportable or transfer medium for use in such device, exchanger or system.

BACKGROUND OF THE INVENTION

In refrigerating units and heat pumps, the transfer of heat and mass takes place on surfaces of heat exchangers. As a result, for example, the transfer of heat from fluid to fluid, from fluid to vapor or vapor to fluid is enabled. Major pressure differences between vapor phase and fluid phase or corrosion stability as a result of chemically aggressive media represent just a part of the challenges for reliable heat exchangers in such areas of use.

In conventional absorption refrigeration systems, for example, heat exchangers are produced from a bundle of pipes with substantial length. In such exchangers, the pipe bundles are integrated bilaterally into metallic plates via seals by cold forming or using welded seams. The disadvantage of using lengthy pipe bundles is that pressure differences caused in the pipe bundles due to temperature differences must be compensated by cost-intensive measures which at the same time often have a negative impact on heat transfer and energy efficiency of the systems. Also, systems which make use of pipe bundles are difficult or costly to manufacture.

An efficient transfer of heat also requires an equal distribution of a heat transportable medium throughout the pipe bundles. In the case of a horizontal design, a heat transportable medium can be distributed using either trickling tanks positioned above the pipes or an appropriate number of spray nozzles. To achieve equal distribution the trickling tanks often comprise a large number of relatively small boreholes. However, this involves at least the risk that some of the boreholes of the trickling tanks or the boreholes of nozzles being choked due to dirt or metal particles present in circulation. Choking of the boreholes would reduce the efficiency of heat transfer.

As it can be understood, the efficiency of heat exchange devices depends on a number of factors, including the surface area and thermal property of wall surfaces, flow rates of the heat transporting medium (e.g. a heat transfer liquid), and other dynamic parameters. Turbulent flow rates of heat transfer liquid across the heat exchanger panels can, to a certain extent, facilitate the heat transfer process. However, the pressure drop across the inlet and the outlet of heat exchange devices increases exponentially when the optimum flow speed of the specific geometry is exceeded. Such a high pressure drop is detrimental to the devices. In addition, if the heat transfer liquid flows at a higher-than-optimum speed, the coefficients of total performance of the desorption/absorption process will also be lower, as there is not sufficient time for a heat transfer surface to exchange thermal energy with the heat transporting medium. To realize a higher flow rate of the heat transporting medium, which may be a liquid, a duct or tube of a larger diameter would have to be used. However, such can only provide a limited increase in area of heat transfer surface of the duct/tube/chamber. Engineers are thus constrained by compromising, on the one hand, on the flow rate and, on the other hand, pressure drop across the inlet and outlet of the heat exchanger.

The temperature gradient between the inlet and the outlet of a heat exchanger is also an important factor in determining its performance, especially when such is driven by lower heat levels, which is typical in waste or solar heat. Firstly, vaporization of refrigerant charges high thermal energy into the vapour phase and subsequent condensation to liquid phase in the condenser require rapid heat transfer at a high pressure. Secondly, when vaporized refrigerant enters the absorption stage, dissolution of such vapour refrigerant into the absorbing transport solution dissipates the enormous heat energy, and thus again requires rapid heat transfer at a low pressure.

To achieve rapid heat transfer, engineers have used passive cooling, in which the heat transporting medium flows through the heat exchanger directly. In passive cooling, it is possible to maintain the pressure across the inlet and outlet by increasing the diameter of the pipe. However, due to deteriorating available surface to volume aspect ratio, it is not possible to realize an efficient heat exchanger. Although micro-channel coolers can have excellent heat transfer due to increased surface area, there is a significant pressure drop across the system. Such a significant pressure drop is not only detrimental to the reliability of the device; it also lowers the coefficients of total performance of the heat pumps.

The present invention seeks to address issues of heat transfer efficiency, pressure drop, heat transfer device fabrication, device durability and/or expandability of heat transfer system, or at least to provide an alternative to the public.

DE-OS 2238045 discloses the design of a heat exchanger for a film-type evaporator for the purification of water. In this heat exchanger, water is sprayed by spray nozzles onto a bundle of horizontally mounted pipes through which hot water vapor flows. The hot water evaporates water from surface films flowing over the exterior of the pipes. The heat exchanger, or an evaporator, can be part of a multiple system. The pipes in the heat exchanger can be corrugated inside and outside. To minimize mechanical damage due to large pressure differences between the ends of the pipes, suitable reinforcements of seals between the pipes and metal plates connected thereto are suggested.

EP 095291 3 B1 discloses a design by which heat is transferred from a pressurized vapor onto a fluid. The fluid is evaporated in order to operate a desalinization plant for sea water, for example. In the design, bag-like channels are formed from oppositely positioned plastic films, whereby evaporation of fluid occurs on the exterior surface and condensation on the interior surface. Flexibility of the channels provides leeway for bulging during pressurization. EP 095291 3 B1 also discloses a design which makes use of lining up of multiple heat exchanger foils. A design of this type would also be usable for the ejector of an absorption refrigeration system.

SUMMARY OF THE INVENTION

According to a first aspect of the present invention, there is provided a heat transfer device comprising a first heat transfer member defining a heat exchange surface with which a heat transportable or transporting medium contacts in use and via which heat is transferable between the heat transportable medium and a working medium, and a device body for containing the heat transportable medium, wherein the body defines at least a first chamber, a second chamber and a third chamber which are in fluid communicable relationship, the body is configured to allow the heat transferable medium fluid to pass from the second chamber to the first chamber and then to the third chamber, or from the third chamber to the first chamber and then to the second chamber, and the second chamber is sandwiched or otherwise positioned between the first chamber and the third chamber in the body. This configuration of the heat transfer device can achieve a relatively high efficiency in heat transfer as compared to conventional devices but without having to generate a high pressure in introducing the heat transportable medium in the body. The thermal transfer flux (W/m2K) across the heat transfer member can reach 25,000 W/m2K at a flowrate 10 L/min. Such heat transfer flux is substantially higher than that can be achieved by conventional devices. The heat transfer flux of conventional devices can typically reach no higher than 14,000 W/m2K.

Preferably, the body may be provided with a first passageway allowing the heat transportable medium to enter or exit the second chamber, and a second passageway allowing the heat transportable medium to enter or exit the third chamber. The first passageway may be an outlet allowing the heat transportable medium to exit the body while the second passageway may be inlet allowing the heat transportable medium to enter the body or vice versa. Depending on the circumstances, the passageway may conveniently be an inlet or outlet.

In one embodiment, the heat transfer member may be in direct contact with or part of the first chamber such that heat transfer between the heat transfer member and the first chamber can take place, but not in direct contact with the second chamber. In such embodiment, heat exchange takes place directly between the heat transfer member and the heat transportable medium.

In some embodiments, the body may be provided with channels allowing the heat transportable medium to pass from the first chamber to the second chamber or vice versa. The body may be provided with channels allowing the heat transportable medium to pass from the first chamber to the third chamber or vice versa.

Advantageously, at least one of the chambers may be made of at least a pair of oppositely facing plates generally arranged in parallel to each other. The first chamber and the second chamber may be separated by a plate at which a plurality of openings are provided and generally evenly distributed, allowing the heat transportable medium to pass from the first chamber to the second chamber or vice versa. The provision of the evenly distributed openings and/or channels enhances a generally even temperature of the heat transportable medium within the chamber, and minimizes the temperature gradient across the plates.

The first chamber and the third chamber may be separated by the second chamber at which a plurality of channels may be provided and generally evenly distributed, allowing the heat transportable medium to bypass the second chamber and pass from the first chamber to the third chamber or vice versa.

In one embodiment, the body may include means for regulating flow direction of the heat transportable medium entering or exiting the first chamber, the second chamber or the third chamber.

In an embodiment, the body may further define a fourth chamber, a fifth chamber and a sixth chamber which are in fluid communicable relationship, the body may be configured to allow the heat transportable medium to pass from the fifth chamber to the fourth chamber and then to the sixth chamber, or from the sixth chamber to the fourth chamber and then to the fifth chamber, and the fifth chamber may be sandwiched or otherwise positioned between the fourth chamber and the sixth chamber.

In another embodiment, the device may further comprise a second heat transfer member defining a heat exchange surface with which a heat transportable medium contacts in use and via which heat is transferable between the heat transportable medium and a working medium, wherein the body further may further define a fourth chamber and a fifth chamber which together with the third chamber are in fluid communicable relationship, the body may be configured to allow the heat transportable medium to pass from the fourth chamber to the fifth chamber and then to the third chamber, or from the third chamber to the fifth chamber and then to the fourth chamber, and the fourth chamber may be sandwiched or otherwise positioned between the third chamber and the fifth chamber.

In yet another embodiment, the device may further a heat transporting medium including a base fluid and a solid nanofiller, wherein $$\frac{\text{surface area of the solid } \mathit{nanofiller} \ (A_{\mathit{fl}})}{\text{area of the heat exchange surface } (A_{\mathit{ex}})}$$

is above 100. The use of such a transporting medium further improves heat exchange between a heat transporting medium and the working medium.

According to a second aspect of the present invention, there is provided a heat transfer device for exchange of thermal energy between zones of elevated and reduced temperature, comprising a heat transportable medium, a device body to contain the heat transportable medium, and a heat transfer member, wherein the device body is configured to allow the heat transportable medium to move between the zones of elevated and reduced temperature, the heat transfer member defines a heat exchange surface with which the heat transportable medium contacts in use and via which heat is transferable between the heat transportable medium at one side of the heat transfer member and a working medium at opposite side of the heat transfer member, the heat transportable medium includes a base fluid and a solid nanofiller, and $$\frac{\text{surface area of the solid } \mathit{nanofiller} \ (A_{\mathit{fl}})}{\text{area of the heat exchange surface } (A_{\mathit{ex}})}$$

is above 100.

Preferably, the viscosity of the heat transportable medium may be from 1 to 5,000 mPa·s. At least one dimension of the solid nanofiller may have a thermal conductivity of more than 150 W/mK.

According to a third aspect of the present invention, there is provided a heat transfer device assembly comprising at least two heat transfer devices as described above.

According to a fourth aspect of the present invention, there is provided a heat exchanger comprising a heat transfer device or a heat transfer device assembly as described above.

According to a fifth aspect of the present invention, there is provided a method of manufacturing a heat transfer device, comprising, providing a device body having at least a first wall, a second wall, a third wall and a fourth wall arranged in a layered manner such that a first cavity is defined between the first wall and the second wall, a second cavity is defined between the second wall and a third cavity is defined between the third wall and the fourth wall, and the second cavity is sandwiched or otherwise positioned between the first cavity or the second cavity, providing the walls with channels such that the first cavity, the second cavity and the third cavity are in fluid communicable relationship, and providing the device body with a first passageway allowing fluid to enter or exit the second cavity and a second passageway, and a second passageway allowing fluid to enter or exit the third cavity, such that fluid can pass enter the device body firstly into the second cavity, secondly into the first cavity and thirdly into the third cavity and then exiting the device body, or firstly into the third cavity, secondly into the first cavity and thirdly into the second cavity and then exiting the device body. Preferably, the method may include a step of prefabricating at least one of the walls and/or assembling of prefabricated walls. The use of prefabricated walls allow the heat transfer device be built modularly and cost efficiently. It also provides more design freedom to suit a particular heat exchange need.

According to a sixth aspect of the present invention, there is provided a heat transfer device for use in an absorption refrigeration system, the device is configured to provide a first fluid chamber arranged between a first plate for heat transfer and a second plate positioned opposite to the first plate, a second fluid chamber arranged between the side of the second plate facing away from the first fluid chamber and a third plate positioned opposite to the second plate, and a third fluid chamber arranged between the side of the third plate facing away from the second fluid chamber and fourth plate positioned opposite to the third plate. The device is further configured such that the second plate comprises first openings substantially distributed equally across the entire second plate for fluid exchange between the first fluid chamber and the second fluid chamber, and the second plate comprises second openings substantially distributed equally across the entire second plate connected with third openings of the third plate by means of first connecting channels for fluid exchange between the first fluid chamber and the third fluid chamber. The third openings likewise are substantially distributed equally across the entire third plate. Therein, the heat transporting media is distributed across the whole surface of all the plates via the openings for heat transfer purpose such that the temperature gradient across the plates can be minimized.

In one embodiment, the device may comprise a fourth fluid chamber arranged between the side of the fourth plate facing away from the third fluid chamber and a fifth plate positioned opposite to the fourth plate, and a fifth fluid chamber arranged between the side of the fifth plate facing away from the fourth fluid chamber and a sixth plate for heat transfer positioned opposite to the fifth plate. The device may be configured such that the fifth plate comprises fourth openings substantially distributed equally across the entire fifth plate for fluid exchange between the fifth fluid chamber and the fourth fluid chamber. The fifth plate is further provided with fifth openings substantially distributed equally across the entire fifth plate and connected with sixth openings of the fourth plate. The fifth openings and the sixth openings are connected by means of second connecting channels for fluid exchange between the fifth fluid chamber and the third fluid chamber. The sixth openings likewise are substantially distributed equally across the entire fourth plate.

In another embodiment, the device may comprise a seventh plate arranged at the side of the first plate opposite to the first fluid chamber for heat transfer. In this embodiment, the device comprises a sixth fluid chamber positioned between the seventh plate and an eighth plate positioned opposite to the seventh plate. A seventh fluid chamber is arranged between the side of the eighth plate facing away from the sixth fluid chamber and a ninth plate positioned opposite to the eighth plate, and an eighth fluid chamber is arranged between the side of the ninth plate facing away from the seventh fluid chamber and a tenth plate positioned opposite to the ninth plate. The eighth plate comprises seventh openings substantially distributed equally across the entire eighth plate for fluid exchange between the sixth fluid chamber and the seventh fluid chamber, and eighth openings substantially distributed equally across the entire eighth plate and connected with ninth openings substantially distributed equally across the entire ninth plate by means of third connecting channels for fluid exchange between the sixth fluid chamber and the eighth fluid chamber.

Preferably, the device may comprise a supply line flowing into the second fluid chamber and a discharge line connected with the third fluid chamber or that the supply line flowing into the third fluid chamber and the discharge line connected with the second fluid chamber.

Advantageously, the device may be configured such that the surface of the first plate is designed structured.

In a preferred embodiment, the device may be configured such that the side of the first plate facing away from the first fluid chamber connected with the conduct for a working medium as a single or integral part. The device may be configured such that the first plate, the second plate, the third plate and the fourth plate are arranged substantially in parallel. The device may comprise fixtures for flow regulation in at least one of the fluid chambers.

According to a seventh aspect of the present invention, there is provided a heat exchanger comprising at least one heat transfer device as described in the sixth aspect of the present invention.

According to an eight aspect of the present invention, there is provided an absorption refrigeration system comprising at least one heat exchanger as described in the seventh aspect of the present invention.

According to an ninth aspect of the present invention, there is provided a device for transfer of thermal energy between zones of elevated and reduced temperature, the device including at least a passageway provided with a heat exchange surface within which a heat transporting medium is movable between said zones of elevated and reduced temperature, wherein the heat transporting medium comprises a base fluid and a solid nanofiller; and wherein $$\frac{\text{surface area of the solid } \textit{nanofiller } (A_{fl})}{\text{area of the heat exchange surface of the passageway } (A_{ex})}$$

is above 100.

Preferably, the viscosity of the heat transporting medium may be from 1 to 5,000 mPa·s. At least one dimension of the solid nanofiller may be less than 100 nm in diameter. At least one dimension of the solid nanofiller may have a thermal conductivity of more than 150 W/mK.

In one embodiment, the device may be a heat exchanger.

In another embodiment, the device may be adapted for use in dual phase absorption/desorption processes. In such embodiment, the heat transporting medium contains or accommodates a gas in dissolved or chemically bound form. The gas may be hydrogen. The nanofiller may be coated with at least one metallic catalyst. The device may be adapted to release the gas by introducing thermal energy, solar heat, combustion or waste energy. The device may be adapted to absorb the gas into a liquid by exothermic energy release.

An advantage of the invention is that the device has a layer-shaped structure that can be produced easily using prefabricated plates of plastic, metal and composite materials, which is mechanically robust, has a high thermal efficiency and therefore represents a particularly economic solution. Thereby a large number of openings for the distribution of heating or refrigerating media against plates for heat transfer with or without channels (channel plates) can be provided, which are overflowed like a film or cross-flowed in channels running in parallel by a working medium.

A working medium contacting the first plate can be provided on the side of the first plate positioned opposite to the first fluid chamber. By a multitude of equally distributed first and second openings an equal transfer of heat can be ensured on the entire surface of the first plate, which is largely independent from the conductance of the working medium along the first plate.

The device can be produced easily in modular construction method, whereby different plates and fixtures can be provided so that different flow situations can easily be ensured. Thereby it is possible to provide equal refrigeration/heating for the solution mixture. The device can comprise a simple and compact structure, which can be produced cost-effectively and efficiently. In particular, a sandwich-like embodiment made of multiple plates can be provided, which limit the fluid chambers. Fixtures can be provided in the fluid chambers for conductance of the flow, which can be performed on one or both sides of a plate.

As a result, it is possible to provide the advantages specified above in a heat exchanger and/or an absorption refrigeration system. Preferably, a multitude of devices are connected tightly to another, as a result of which a particularly compact design can be achieved.

There are diverse applications of thermal driven absorption and desorption processes via heat exchangers. Such include heat pumps, refrigerators, air-conditioners, absorption chillers, and hydrogen desorption/absorption into liquid carrier fluids.

BRIEF DESCRIPTION OF THE DRAWINGS

Embodiments of the present invention will now be described, by way of non-limiting example only, with reference to the accompanying drawings, in which.

DETAILED DESCRIPTION OF PREFERRED EMBODIMENTS OF THE INVENTION

Figure 1:
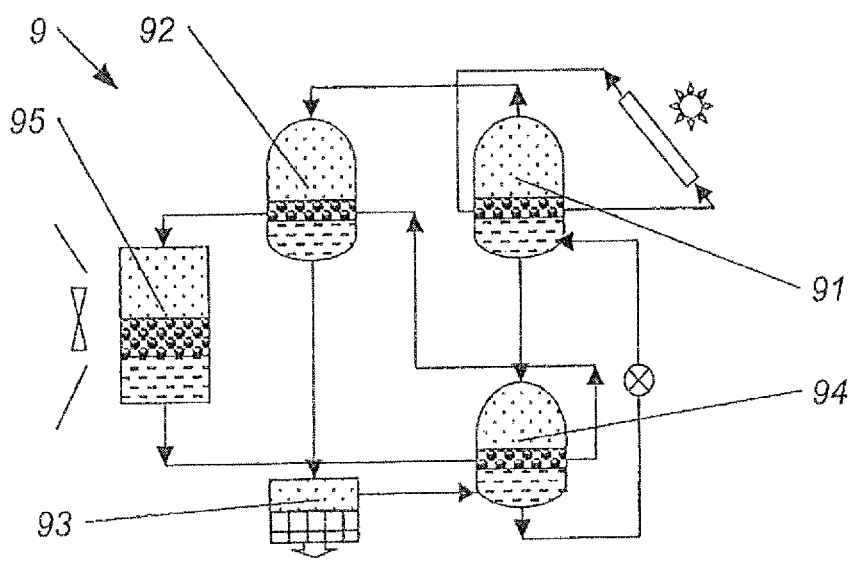
FIG. 1 shows a simplified pictorial schematic of an absorption refrigeration cycle.

FIG. 1 shows a pictorial schematic of an absorption refrigeration system 9 with solar power supply. An ammonia water solution, for example, can be contained in the solvent evaporator 91 of the absorption refrigeration system designated as ejector. In this case, the solution is heated indirectly by vapor or hot water from a thermal solar system, for example. Alternatively to the thermal solar system, any other suitable heat source capable of providing the necessary vaporization temperature can be used. The ammonia vapor subsequently escapes from the solvent evaporator 91. In most cases the vapors are then separated from water residues through a separation column or rectification column (not shown in FIG. 1), and then fed into a liquefier 92. Then the liquefied ammonia is stored in a high-pressure collector (not shown in FIG. 1). For conditioning, an air flow from connected refrigeration consumers is delivered into a heat exchanger 93, where the refrigerant ammonia evaporates by pressure reduction and the air flow is refrigerated.

After the heat exchange, the ammonia vapors are aspirated through a suction channel by an absorber 94. The residue from the solvent evaporator 91, a low-ammonia refrigerated solution, is used as absorbent. The low-ammonia solution is introduced into the absorber 94 and the absorber 94 is circulatory cooled by means of external cooling, in order to remove the solution heat. The low-ammonia solution has the tendency of absorbing ammonia until saturated. Then the saturated solution enriched in the absorber 94 is pumped back into the solvent evaporator 91.

The cooling water of an external cooling is reconditioned to operating temperature in a closed cycle by an air-cooling device 95.

Instead of ammonia, a hygroscopic salt can also be used.

In an absorption refrigeration system 9 of this type, a heat transfer device as described below and a heat exchanger as described below can be used particularly efficiently. As a result, it is possible to provide the absorption refrigeration system 9 easily, cost-effectively and with a high efficiency.

FIGS. 2 to 7 show various embodiments of heat transfer devices according to the present invention for use in an absorption refrigeration system.

Figure 2:
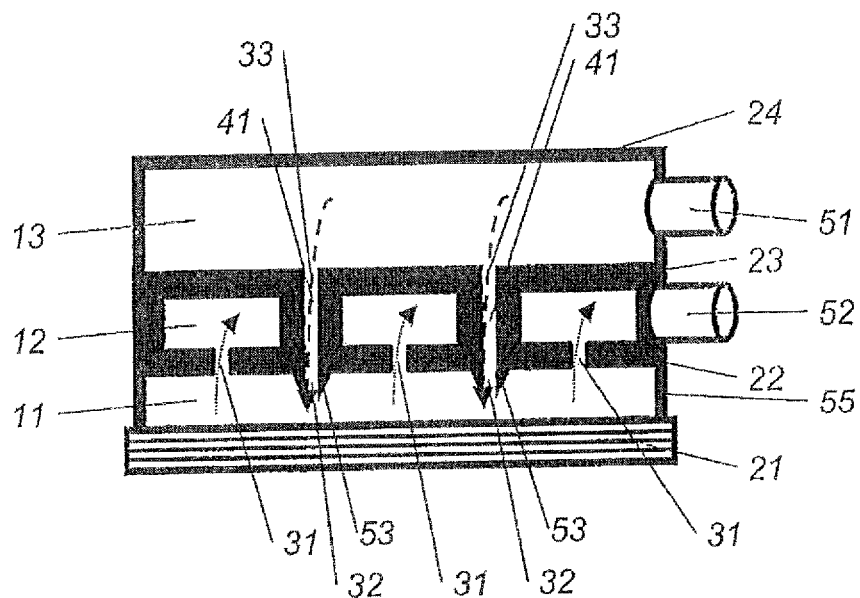
FIG. 2 is a section view of a first embodiment of a heat transfer device in accordance with the present invention.

FIG. 2 shows a first embodiment of a transfer device. The device comprises a first fluid chamber 11, which is arranged between a first plate (or wall) 21 for heat transfer and a second plate 22 positioned opposite to the first plate 21, a second fluid chamber 12, which is arranged between the side of the second plate 22 facing away from the first fluid chamber 11 and a third plate 13 positioned opposite to the second plate 22, and a third fluid chamber 13, which is arranged between the side of the third plate 23 facing away from the second fluid chamber 12 and fourth plate 24 positioned opposite to the third plate 23. The second plate 22 comprises first openings 31 substantially distributed equally across the entire second plate 22 for fluid exchange between the first fluid chamber 11 and the second fluid chamber 12. The second plate further comprises second openings 32 of the second plate 22 substantially distributed equally across the entire second plate 22 and they 32 are connected with third openings 33 of the third plate 23 by means of first connecting channels 41 for fluid exchange between the first fluid chamber 11 and the third fluid chamber 13. The third openings are also substantially distributed equally across the entire third plate 23. In one operation, a supply line 51 in the form of an inlet is connected to the third fluid chamber 13 allowing fluid to flow firstly into the cavity defined by the third fluid chamber 13. A discharge line 52 in the form of an outlet is connected to the second fluid chamber 12 allowing fluid to exit from the cavity of the second fluid chamber 12. Flow path of the liquid in this embodiment is shown by the arrows in FIG. 2.

It is however to be understood that in other operations or applications the direction of flow of fluid can reverse in that fluid can enter via the line 52 and exit from the line 51. In such embodiments, the device allows a heat transportable or transporting fluid be firstly introduced into the second fluid chamber 12, and secondly into the first fluid chamber 11 through the first openings 31. Upon reaching the first fluid chamber 11, the fluid comes into contact with a heat exchange surface of the plate 21 and heat exchange between the fluid and the plate takes place, and as a result the temperature of the fluid is changed in the first fluid chamber. Depending on the temperature difference between the fluid and the first plate, heat is transferred from the fluid to the first plate, or vice versa. The fluid thirdly departs the first fluid chamber and enters in the third fluid chamber 13 through the second openings 32 and the third openings 33 connected by opposite ends of and defined by connecting channels 41.

It is to be understood that a merely minor exchange of heat takes place respectively in the second fluid chamber 12 and in the third fluid chamber 13, and the fluid has an approximately uniform temperature in the second fluid chamber and the third fluid before or after it flows into the first fluid chamber 11 through the first (or second) openings. Due to the first openings 31 (and second openings 32) substantially distributed equally across the entire second plate 22, it can be achieved that the fluid flowing onto the first plate 21 substantially has the same temperature in the entire area. Due to an equally alternating distribution of the first openings 31 and the second openings 32, it can be achieved that fluid cells are formed, whereby the fluid substantially flows from one of the first openings 31 to the first plate 11 and then through one of the adjacent second openings 32 (or vice versa).

A working medium contacting the first plate 21 can be provided on the side of the first plate 21 positioned opposite to the first fluid chamber 11. By a multitude of equally distributed first and second openings an equal and even transfer of heat can be ensured on the entire surface of the first plate 21, which is largely independent from a conduct 61 of the working medium along the first plate 21.

To enhance heat transfer, the surface of the first plate 21 can be designed structured. An enlargement of the contact surface between the fluid and the first plate 21 can easily be achieved by such structuring, by which it is possible to achieve an improved transfer of heat.

It can also be provided to achieve an enlargement of the contact surface between the working medium and the first plate 21 by structuring the surface of the first plate 21. It can be provided in particular that the side of the first plate 21 facing away from the first fluid chamber is connected with the conduct 61 of the working medium as a single part. The conduct 61 can be designed in particular as open or closed channel. This way, it is possible to ensure an efficient transfer of heat between the working medium and the first plate 21.

The supply line 51 and/or the discharge line 52 can be connected non-detachably with the device at least in the area of the second fluid chamber 12 and/or the third fluid chamber 13.

Nozzles 53 can be provided in the entry area of the fluid into the first fluid chamber 11, by which it is possible to influence the direction of flow of the fluid in the first fluid chamber 11. As a result, it is possible to improve the efficiency of the device. The nozzles 53 can be designed as conical nozzles. Studies during the course of the invention have shown that generating turbulence of the fluid in the first fluid chamber 11 can enhance a more even temperature difference of the fluid and thus enhance a higher efficiency in heat transfer.

Figure 3:
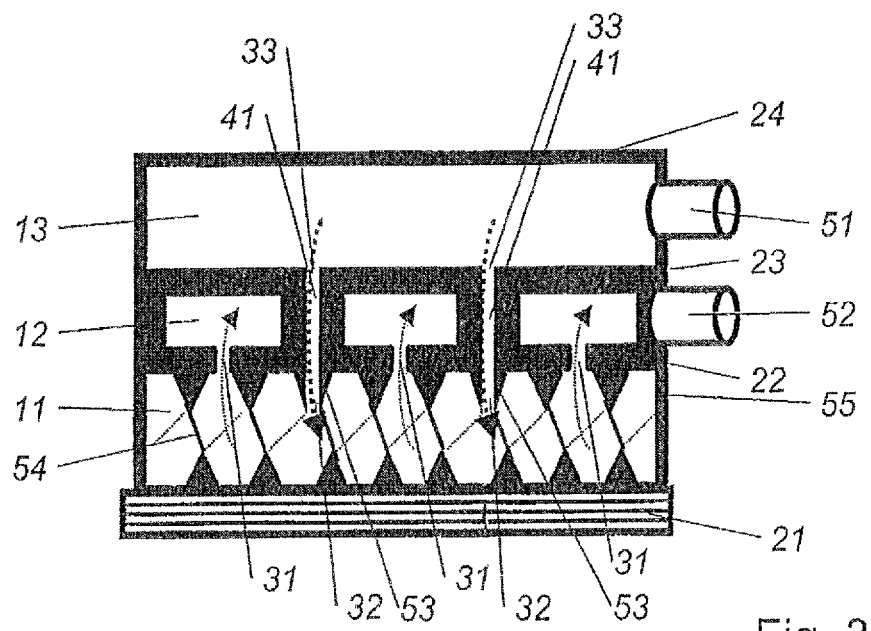
FIG. 3 is a section view of a second embodiment of a heat transfer device in accordance with the present invention.

FIG. 3 shows a second embodiment of a heat transfer device which is similar to the heat transfer device of FIG. 2. In this device, the flow in the first fluid chamber 11 can also be influenced using fixtures 54 for flow regulation. The fixtures 54 can be designed as grid-shaped insert with screw-shaped forms. As a result, it is possible to heavily reduce pressure losses between the first connecting channels 41 and the first fluid chamber 11. The reduction in pressure loss means a lower incoming fluid pressure is needed and the lower pressure means a higher energy efficiency and higher durability of the device.

The fixtures 54 can also be connected firmly with one or more of the plates 21, 22, 23, 24, in particular also connected as a single or integral part.

Studies have found that when the flow of fluid exhibits a screw-shaped pattern the efficiency of heat transfer can be enhanced. Thus, the nozzles and/or the fixtures can be configured to manipulate the fluid flow to exhibit such pattern.

In both the heat transfer devices shown in FIG. 2 and FIG. 3, the first plate 21, the second plate 22, the third plate 23 and the fourth plate 24 are arranged substantially in parallel. This configuration on one hand allows fabrication of the device in a relatively simple fashion. On the other hand, the generally parallel construction allows multiple devices be assembled together into a larger heat exchanger by block assembly.

The device can be provided with a modular design. Thereby, one opening of a casing 55 can be closed by the first plate 21. Then the second plate 22 and the third plate 23 are inserted into the casing 55. The casing 55 can be closed at the side opposite the first plate 21 using the fourth plate 24. With such design, the device can be fabricated efficiently both in a manufacturing and cost point of view.

In addition, the fixtures 54 (and spacers) can be inserted between the plates 21, 22, 23, 24 in the device in order to prevent deflection of the plates. The fixtures 54 and/or spacers can also be connected with the plates 21, 22, 23, 24, in particular as a single or integral part.

It can be understood that the device can be adapted easily to varying requirements by differently formed plates 21, 22, 23, 24 and/or inserts 54. As a result, it is possible to ensure particularly high efficiency of the device for different temperature ranges and/or fluids. If necessary, the device can also be modified easily, if it becomes clear that an improved efficiency can be achieved by changing one of the plates 21, 22, 23, 24 and/or one of the inserts 54.

Studies during the course of the invention have shown that it is particularly advantageous when the first plate 21 is made of metal or a metallic material and the second plate 22, the third plate 23 and the fourth plate 24 are made of, for example, a heat-insulating thermoplastic polymer, an efficient transfer of heat is provided for the first plate 21, whereby the second plate 22, the third plate 23 and the fourth plate 24 serve as thermal insulation. The casing 55, the supply line 51 and the discharge line 52 can also be designed of heat-insulating thermoplastic polymer. The parts made of thermoplastic polymer can be produced in a simple way, e.g. by injection molding. The required space, the weight and the production costs are reduced using these parts.

Figure 5:
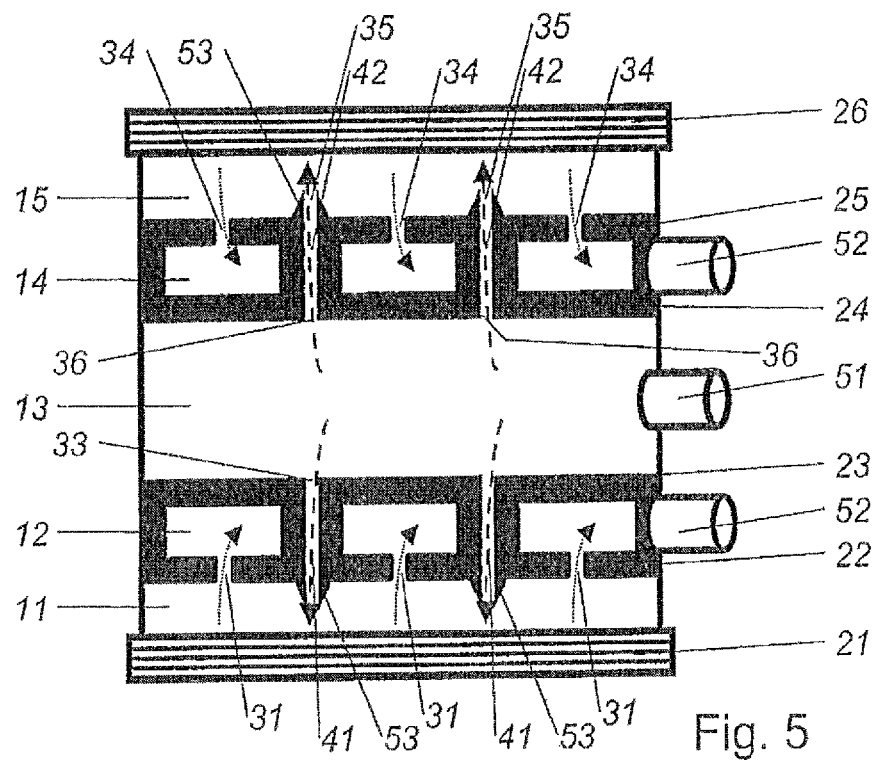
FIG. 5 is a section view of a fourth embodiment of a heat transfer device in accordance with the present invention.

FIG. 5 shows a fourth embodiment of a heat transfer device. This embodiment is similar to the embodiment of FIG. 2 although there are differences. There are provided a fourth fluid chamber 14 arranged between the side of the fourth plate 24 facing away from the third fluid chamber 13 and a fifth plate 25 positioned opposite to the fourth plate 24, and a fifth fluid chamber arranged between the side of the fifth plate 25 facing away from the fourth fluid chamber 14 and a sixth plate 26 for heat transfer positioned opposite to the fifth plate 25, is designed. The fifth plate 25 comprises fourth openings 34 substantially distributed equally across the entire fifth plate 25 for fluid exchange between the fifth fluid chamber 15 and the fourth fluid chamber 14, and fifth openings 35 of the fifth plate 25 substantially distributed equally across the entire fifth plate 25 are connected with sixth openings 36 of the fourth plate 24 substantially distributed equally across the entire fourth plate 24 by means of second connecting channels 42 for fluid exchange between the fifth fluid chamber 15 and the third fluid chamber 13. With this configuration, heat transfer can take place at two sides of the device, i.e. at the first plate 21 and the sixth plate 26. It can be understood that in this embodiment, the device in accordance with FIG. 2 is substantially doubled, whereby the third fluid chamber 13 is used twice and thus not all parts have to be duplicated. As a result, it is possible to provide a compact design with a large surface for heat transfer.

It will be evident to a person skilled in the art that the fifth fluid chamber 15 can be designed in analogy to the first fluid chamber 11. The fourth fluid chamber 14 can be designed in analogy to the second fluid chamber 12.

The fourth plate 24 can be designed in analogy to the third plate 23 and/or the fifth plate 25 in analogy to the second plate 22 and/or the sixth plate 26 in analogy to the first plate 21.

When fabricating the device, the casing is closed by the first plate 21 and the sixth plate 26, and the plates positioned in between, namely the second plate 22, the third plate 23, the fourth plate 24 and the fifth plate 25, are inserted in the casing 55.

Figure 4:
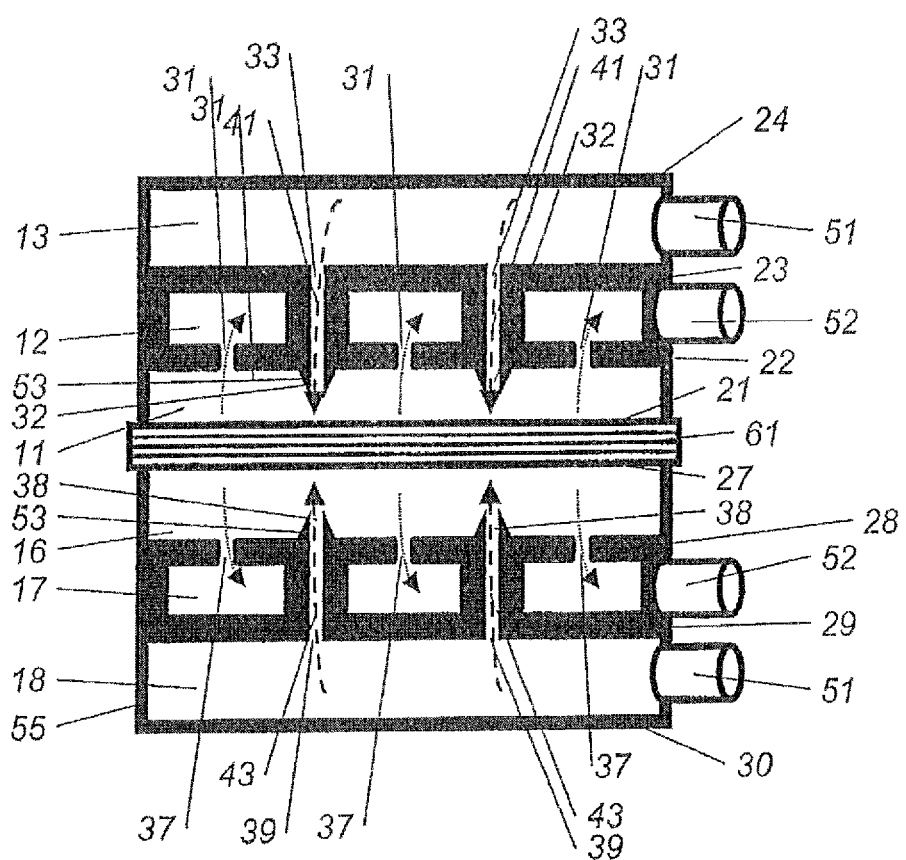
FIG. 4 is a section view of a third embodiment of a heat transfer device in accordance with the present invention.

FIG. 4 shows a third embodiment of a device according to the present invention. The third embodiment is similar to the device of FIG. 2. In this embodiment, there is provided a seventh plate 27 for heat transfer arranged at the side of the first plate 21 for heat transfer positioned opposite to the first fluid chamber 11. Furthermore, there is provided a sixth fluid chamber 16 arranged between the side of the seventh plate 27 facing away from the first fluid chamber 11 and an eighth plate 28 positioned opposite to the seventh plate 27. There is provided a seventh fluid chamber 17 arranged between the side of the eighth plate 28 facing away from the sixth fluid chamber 16 and a ninth plate 29 positioned opposite to the eighth plate 28. There is provided an eighth fluid chamber 18 arranged between the side of the ninth plate 29 facing away from the seventh fluid chamber 17 and a tenth plate 30 positioned opposite to the ninth plate 29.

The eighth plate 28 comprises seventh openings 37 substantially distributed equally across the entire eighth plate 28 for fluid exchange between the sixth fluid chamber 16 and the seventh fluid chamber 17, and eighth openings 38 of the eighth plate 28 substantially distributed equally across the entire eighth plate 28 are connected with ninth openings 39 of the ninth plate 29 substantially distributed equally across the entire ninth plate 29 by means of third connecting channels 43 for fluid exchange between the sixth fluid chamber 16 and the eighth fluid chamber 18.

With this configuration, heat exchange can take place between the two working media located in the first fluid chamber 11 and the sixth fluid chamber, respectively, in that heat exchange is effected via both the first plate 21 as well as the seventh plate 27. The device in accordance with FIG. 2 is substantially doubled.

It is evident to a person skilled in the art that the sixth fluid chamber 16 can be designed in analogy to the first fluid chamber 11. The seventh fluid chamber 17 can be designed in analogy to the second fluid chamber 12 and/or the eighth fluid chamber 18 in analogy to the third fluid chamber 13.

The seventh plate 27 can be designed in analogy to the first plate 21 and/or the eighth plate 28 in analogy to the second plate 22 and/or the ninth plate 29 in analogy to the third plate 23 and/or the tenth plate 30 in analogy to the fourth plate 24.

The first plate 21, the conduct 61 of the working medium and the seventh plate 27 can be designed as a single or integral part, for example as a block with boreholes for the working medium, whereby in accordance with the invention the area of the block facing the first fluid chamber 11 represents the first plate 21, the area of the block facing the sixth fluid chamber 16 the seventh plate 27, and the area of the block with the boreholes the conduct 61 of the working medium.

The plates 21, 22, 23, 24, 25, 26, 27, 28, 29, 30 are preferably arranged substantially in parallel for ease of fabrication of the device.

An additional metallic coating can be provided on all surfaces exposed to the fluid and/or the working medium. As a result, a particularly long useful life of the device can be ensured.

It can be provided that at least a part of the surfaces contacted by the fluid comprise a nanocoating, by which it is possible to ensure a particularly low flow resistance and high efficiency of the heat exchanger.

Figure 6:
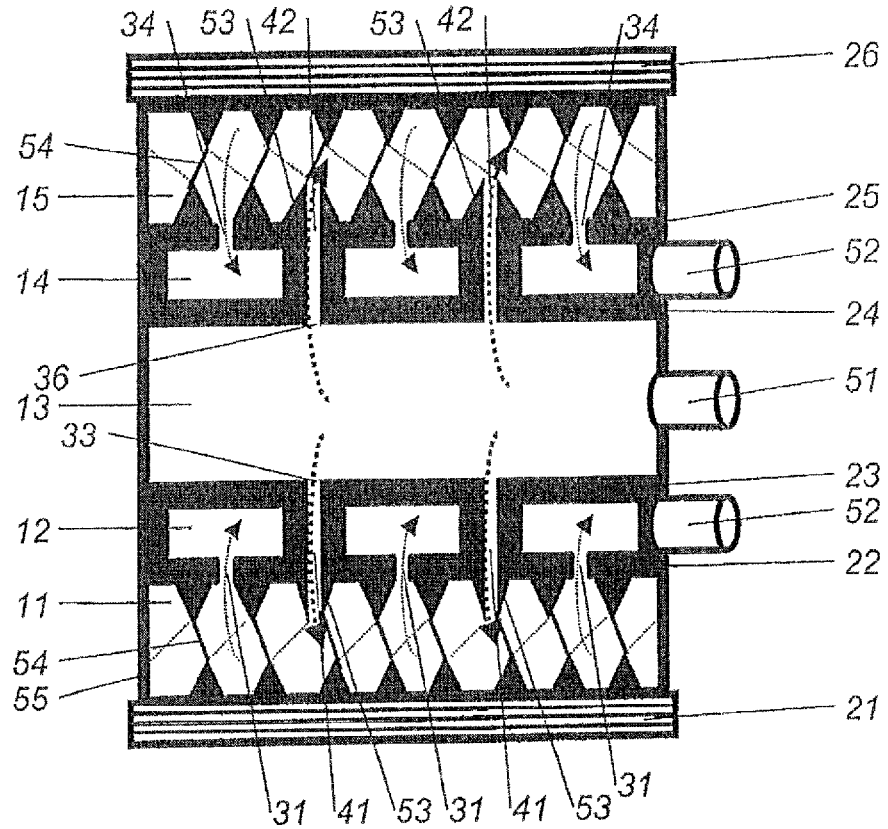
FIG. 6 is a section view of a fifth embodiment of a heat transfer device in accordance with the present invention.

The fifth embodiment in accordance with FIG. 6 corresponds with the fourth embodiment in accordance with FIG. 5, whereby fixtures 54 are provided in the first fluid chamber 11 and in the fifth fluid chamber 15.

Figure 7:
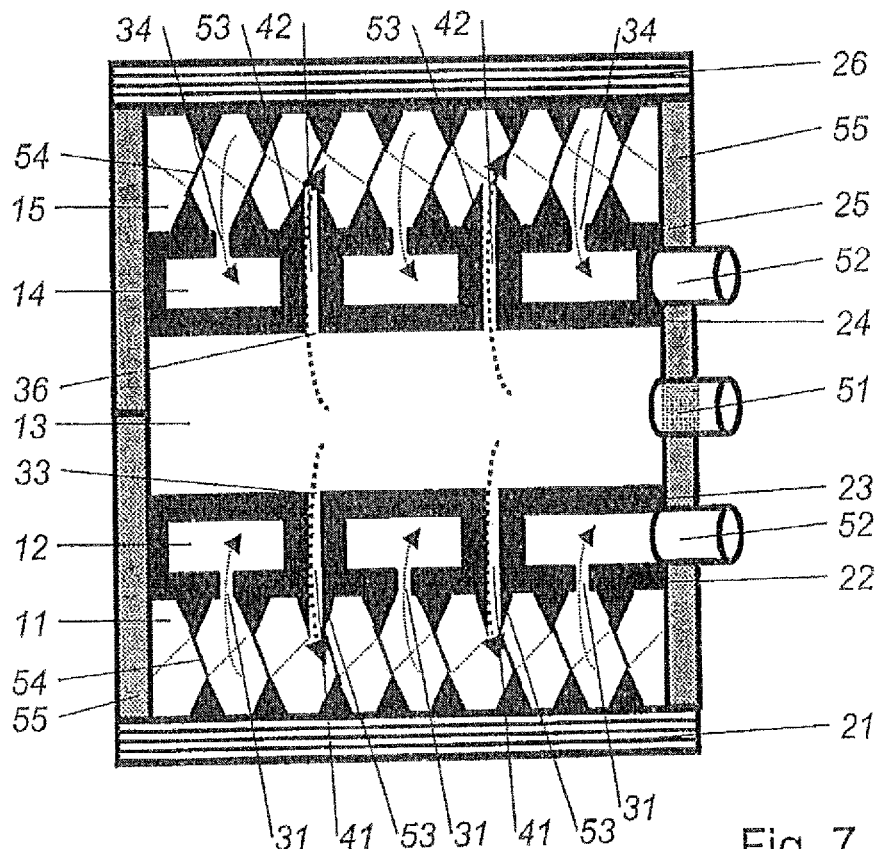
FIG. 7 is a section view of a sixth embodiment of a heat transfer device in accordance with the present invention.

FIG. 7 illustrates a sixth embodiment of a heat transfer device in accordance with the present invention. This embodiment is generally similar to the device of FIG. 6 although the casing 55 is designed reinforced. As a result, it is possible to achieve a particularly pressure-resistant design. The casing 55 is produced of metal or a metallic material. Preferably, a material can be used that is also used for the plates for heat transfer 21, 26, 27. It can be provided that the plates for heat transfer 21, 26, 27 are designed as a single part with the casing 55, for example by cold forming. In the sixth embodiment, for example, the joint between the two halves of the casing 55 can be closed by soldering, cold welding or gluing.

Studies have shown that the thermal transfer flux (W/m2K) across the heat transfer member of embodiments of heat devices according to the present invention can reach 25,000 W/m2K at a flowrate 10 L/min. Such heat transfer flux is substantially higher than that can be achieved by conventional devices. The heat transfer flux of conventional devices can typically reach no higher than 14,000 W/m2K. Studies have also shown that comparing to novel devices of the present invention with conventional devices, when there is a same pressure drop across the particular novel device can typically deliver twice as high of heat exchange efficiency.

Figure 8:
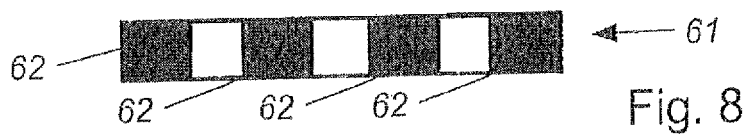
FIG. 8 shows a cross-section view of a conduct for a working medium connected with a plate for heat transfer.

FIG. 8 shows a cross-section of a model of a conduct 61 for a working medium connected with one of the plates 21, 26, 27 for heat transfer. The conduct 61 comprises channels for the flow of the working medium in a fluid or gaseous condition. A plurality of ribs 62 are provided and positioned between heat transfer surfaces of the plates 21, 26, 27 for heat exchange between the working medium and heat transportable fluid. The conduct 61 is preferably made of a material having a coefficient of heat conductivity of >150 W/mK. The conduct can be connected as a single part with one of the plates 21, 26, 27 for heat transfer and be produced, for example, by chemical treatment such as structured etching, mechanical deformation such as deep drawing, milling or drilling, by joining of multiple parts or by suitable molding methods. The conduct 61 represents fluid chambers for flow-through cooling or heating structures of the working medium. However, this arrangement can preferably also be designed as a closed heat pipe. This is particularly advantageous in situations where access to the cold reservoir of a solid matter can be utilized, for example for astronautic applications, where an outer side of the spaceship is always at a very low temperature.

Figure 9:
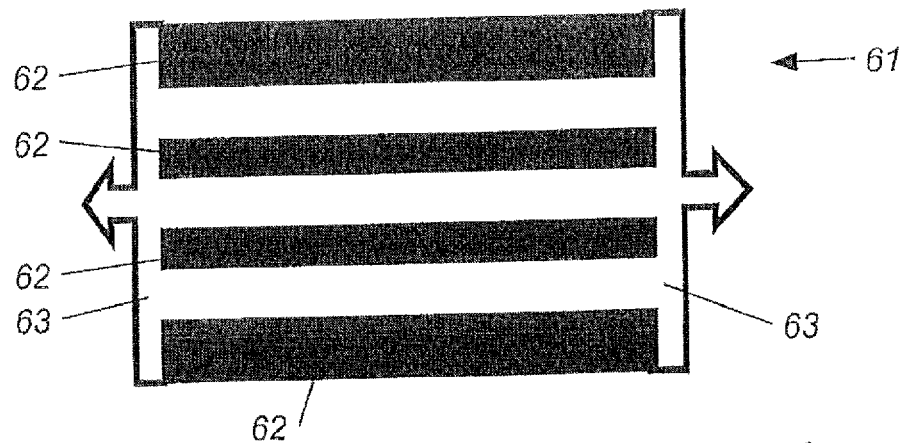
FIG. 9 shows a top view of a model of the conduct in accordance with FIG. 8.
Figure 10:
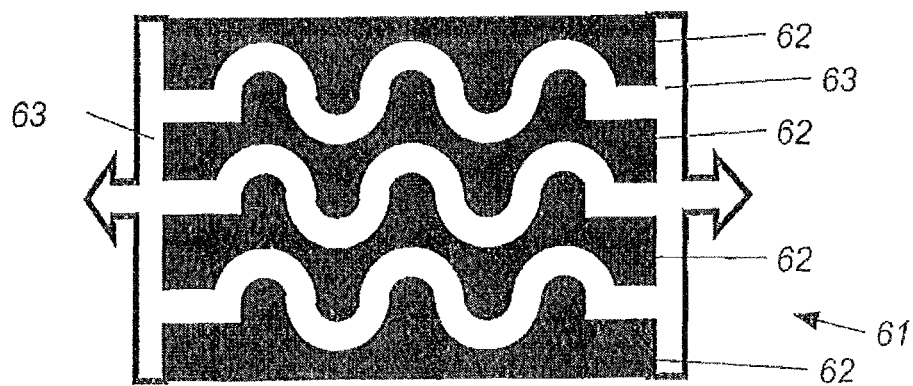
FIG. 10 shows a top view of another model of the conduct in accordance with FIG. 8.

Each of FIGS. 9 and 10 shows a top view of different embodiments of conducts similar to the conduct 61 of FIG. 8.

As shown in FIG. 8 (and FIGS. 9 and 10), the conduct 61 provides a multitude of channels for the working medium between the ribs 62, which run from one side to the opposite side. The cross-section of the channels can be specified at random thereby, for example round or rectangular. Distributors 63 can be provided at the ends of the channels, which distribute or collect the working medium onto the individual channels. The distributors 63 can be connected with supply lines and discharge lines of the working medium by means of connecting pieces.

Studies during the course of the invention have shown that metals or metallically sealed graphites are particularly suitable heat conducting materials for gastight conductance of the working medium. Metallic materials from the aluminum and copper groups are preferably used. Especially under high pressure conditions, metallically coated metal-matrix composites, such as AlSiC for example, are particularly suitable.

Channels shown in FIG. 10 have a meander-shaped design. With this designed, a particularly efficient transfer of heat can be achieved between the plates 21, 26, 27 for heat transfer and the working medium.

Figure 11:
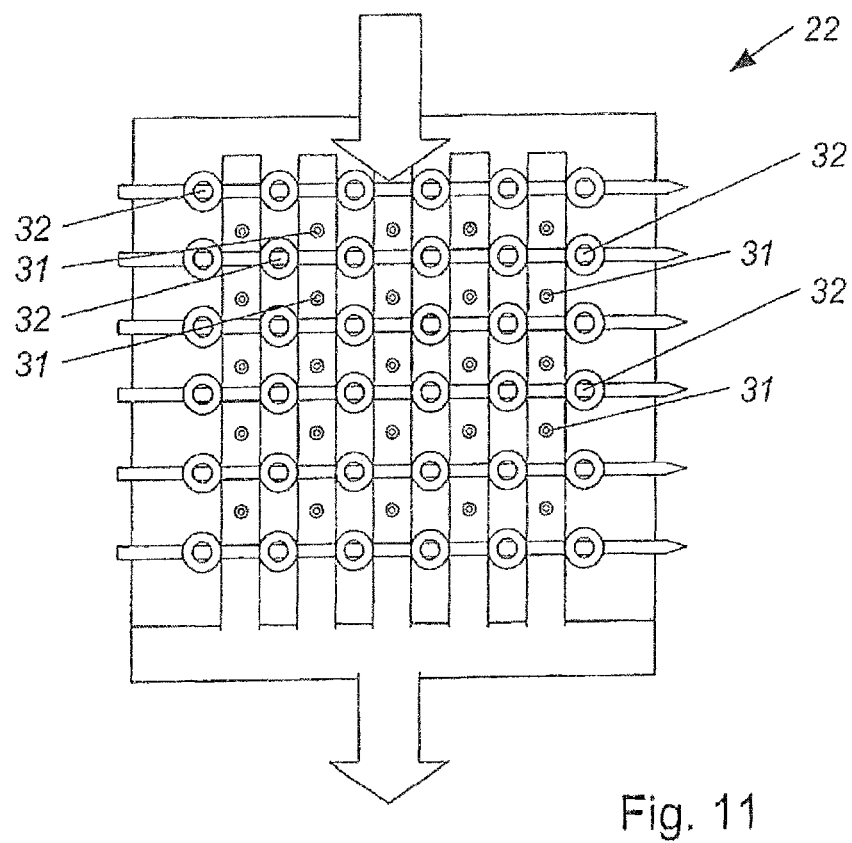
FIG. 11 shows a top view of a second plate of an embodiment of a heat transfer device according to the present invention.

FIG. 11 shows a top view of the second plate 22 of an embodiment of a heat transfer device, whereby a possible distribution of the first openings 31 and the second openings 32 can be seen.

Figure 12:
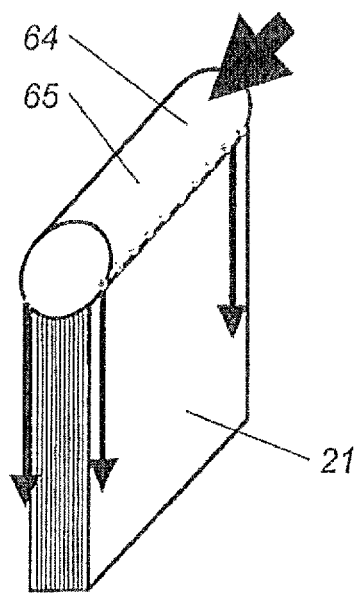
FIG. 12 is perspective view of an embodiment of a heat transfer device with a falling film according to the present invention.

FIG. 12 shows a diagonal view of an embodiment of a heat transfer device with a falling film. By falling film, it means the working medium forms a falling film along the plates 21, 26, 27 for heat transfer. In this configuration, the first plate 21 and the sixth plate 26 form the outer sides of the device, whereby heat transfer is planned on both sides.

The first plate 21 and the sixth plate 26 each form a continuous overflow surface for the working medium.

A feeder pipe 64 with multiple well openings 65, which can be designed slot-shaped, feeds the outer sides of the first plate 21 and the sixth plate 26 arranged in a suspended position with the working medium. The working medium can be a 2-phase working medium, e.g. an ammonia-rich ammonia-water mixture for the solvent evaporator 91, or a low-ammonia ammonia-water mixture for the absorber 94 of an absorption refrigeration system 9. (In other applications, the working medium may be a hydrogen containing or hydrogen-containable medium). By welling up from the well openings 65 onto the first plate 21 and/or the sixth plate 26, a film-like wetting of these plates 21, 26 can be ensured in this way. Resulting gas can escape through a gap (as indicated by the dotted line in FIG. 12) to neighboring devices of the same design.

A particular advantage of this design is its suspended type or nature. With this design, soiling effects of a chemical, mechanical or biological nature that occur over time would not cause any malfunction. Dirt particles gather at the lowest part of the device due to gravity, where a collecting vessel can be provided that is easy to service.

The plates 21, 26, 27 for heat transfer can be provided at least in areas with a coating that absorbs heat radiation. This coating appears to be particularly expedient at the side at which heat is planned to be absorbed when in operation.

Figure 13:
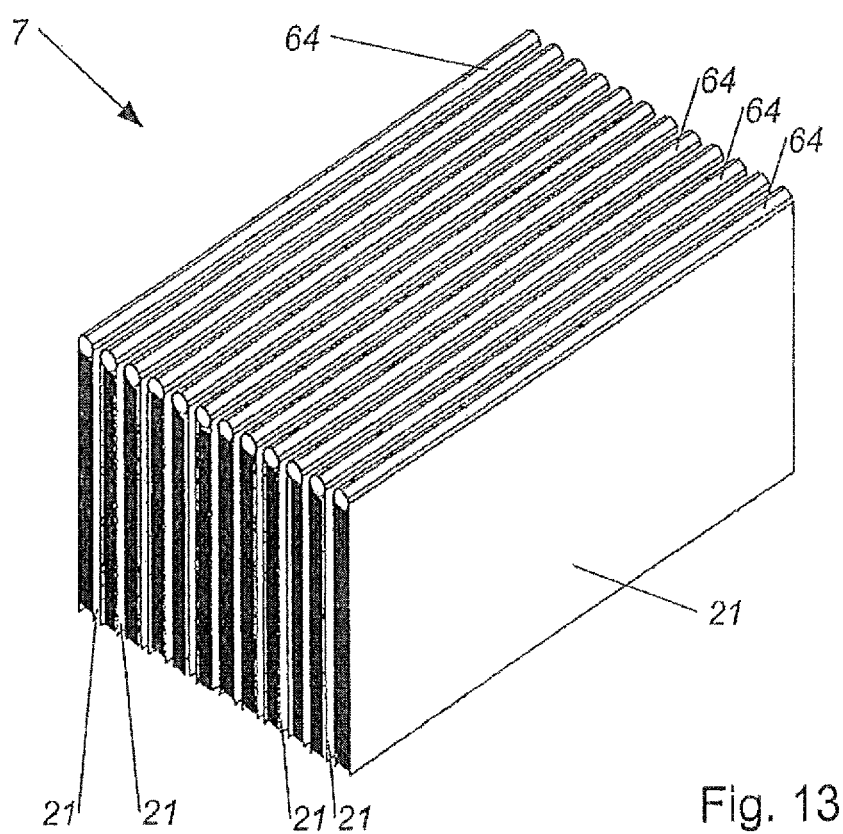
FIG. 13 is a perspective view showing a heat exchanger for heat transfer comprising a multitude of heat transfer devices according to the present invention.

FIG. 13 shows a heat exchanger 7 comprising a multitude of heat transfer devices of FIG. 12. In this design, the heat exchanger 7 permits a particularly space-saving modular line-up of devices for heat transfer for assembly for any performance requirements from standard elements.

When used in an absorption refrigeration system 9 with an ammonia-water solution as shown in FIG. 1, the gap between the two neighboring heat transfer devices can be utilized for feeding or removing the ammonia vapor. With the use of this design, it is possible to keep both internal as well as external pressure differences very low. However, it is also possible to enable major pressure differences between the inside and outside without any functional impairments using this mechanically compact construction.

With this design, multiple heat transfer devices can be connected in parallel for the heat exchanger 7. Alternatively, multiple heat transfer devices can be connected in series. When the heat transfer devices are connected in parallel, the heat exchanger 7 are combined into a heat exchanger block or assembly and, if necessary, the heat exchanger 7 may comprise multiple heat exchanger blocks connected together in series.

Frost-protected, deionized or buffered water, for example, can be used as fluid.

It appears to be particularly advantageous, if the fluid is a liquid with a high capacity. A fluid with nanoparticles can be provided thereby.

A fluid with an addition of particles or fibers with a diameter of less than 100 nm in at least one direction and/or a thermal conductivity of more than 150 W/mK has proved to be particularly advantageous.

Since the development of nano-technology, materials have been engineered showing outstanding properties at the nanoscale. In particular, carbon nanotubes (CNTs) have been shown to have excellent thermal conductivity and electrical conductivity. For some isolated carbon nanotubes, a high value of longitudinal thermal conductivity of up to 6,600 W/mK has been reported.

While the present invention is concerned with the aspects relating to heat transfer devices, the present invention is also concerned with heat transportable or heat transporting medium which can allow or at least enhance a higher heat exchange rate and/or a lower pressure drop across when used in heat transfer devices. In the context of this description, the medium can also be addressed as a nanofluid and has high heat capacitance and thermal conductivity, so that a lower flow rate can be realized, thus reducing the problem of pressure drop in such devices. It is to be noted that while this aspect of the invention is applicable to an absorption chiller air-conditioning system, it is apparent that there are other applications, including dual-phase absorption/desorption apparatus, e.g. hydrogen absorption/desorption processes.

Figure 14:
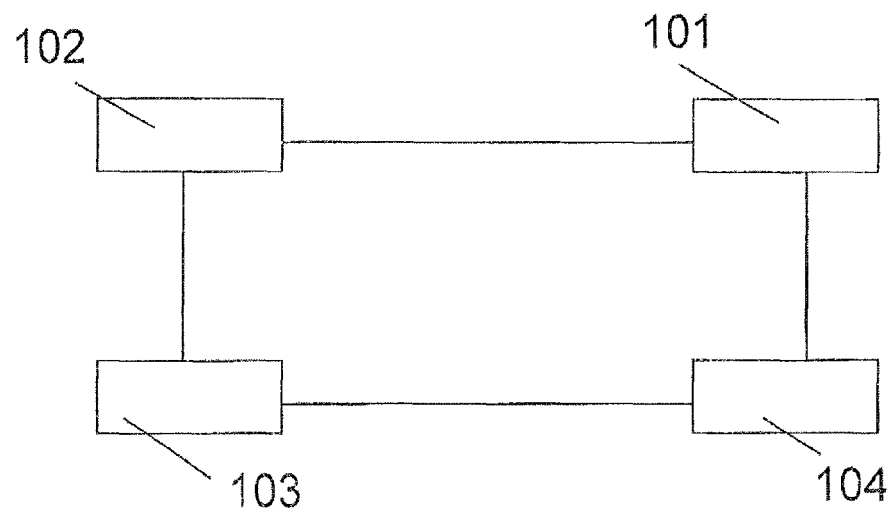
FIG. 14 is a schematic diagram illustrating of the working principle of an absorption chiller.

FIG. 14 shows a desorber 101 which contains a dual-phase working medium or solution, comprising a liquid and a fluent vapour in dissolved or chemically bound form. The working solution can be made a nanofluid by becoming the base fluid of a fluid matrix further comprising of solid nanofiller. The desorber 101 provides the dual-phase working solution with sufficient thermal energy from fuel-combustion, waste- or solar heat, to vaporize the desorbing fluent phase out of the working solution, thus transferring the vapour from the desorber 101 to a condenser 102.

Figure 15:
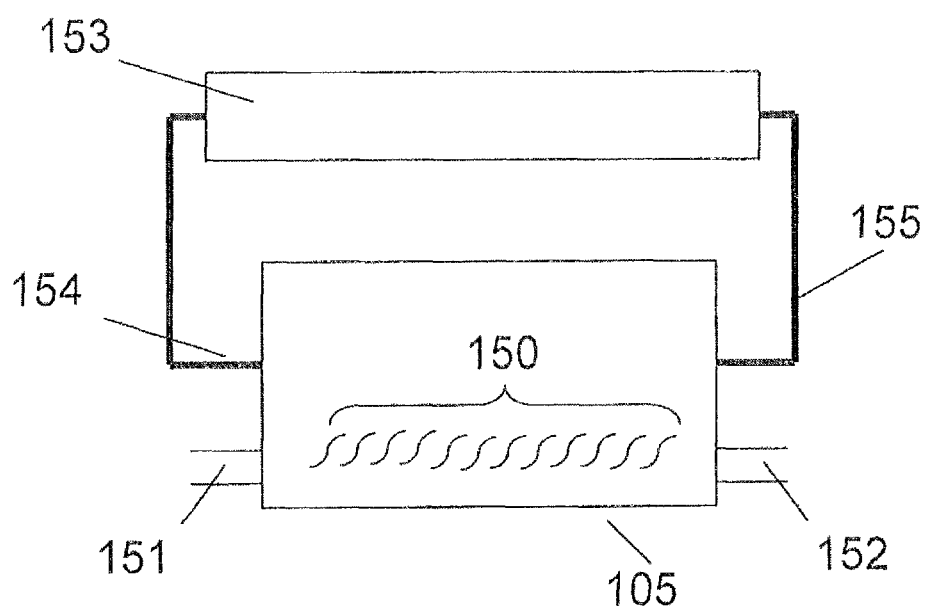
FIG. 15 is a schematic diagram of a heat exchange system according to an embodiment of the present invention.
Figure 16:
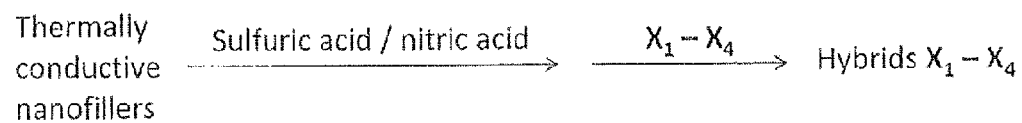
FIG. 16 illustrates functionalization of nano-materials suitable for use in the present invention.

As shown in FIG. 15, in a heat panel surface 153 of a heat exchanger 105 according to the present invention, after collecting sufficient thermal energy, from solar-, waste-, energy cauterization or fuel-combusted heat energy, the nanofiller based heat transfer fluid will carry high thermal energy when entering the desorber 1011 via a duct 154 to a duct 155 (or vice versa). Such a high thermal energy nanofluid will boost the second phase to separate from the working solution supplied via a duct 151, which also could be synthesized to a nanofluid in the desorber 101 much faster than one without nanofluid. The high thermal energy vapour phase will flow out of the heat exchanger 105 via duct 150 to the condenser 102, while the poor working fluid solution remaining the base fluid for the nanofiller matrix fluid, flows back to the absorber 104 via a duct 152.

In the condenser 102, the desorbed vapour from the desorber 101 is cooled from gaseous state into liquid state. In the condenser 102, a heat exchanger cooled by a further nanofluid is adopted for achieving a high efficiency in heat exchange. The nanofluid conducts heat from the refrigerant from a zone of elevated temperature to a zone of reduced temperature.

As shown in FIG. 15, vapour with high thermal energy generated in the desorber 101 will be transferred via the duct 151, such that the thermal energy is exchanged with a lower temperature zone, so that the desorbed vapour will condense into liquid. Nanofluid is pumped from the duct 154 to the duct 155 (or vice versa) across the heat panel 153 for this purpose. Nanofluid with extremely high heat capacitance will transfer the thermal energy to the outside re-cooler 153, so the working fluids vapour from duct 151 to 152 (or vice versa) for condensation into refrigerant. Condensed refrigerant with lower thermal energy will flow via the duct 151 to the duct 152 (or vice versa).

When the liquid refrigerant enters an evaporator 3 via an expansion valve, the pressure within the evaporator 103 will drop. Under such a reduced pressure, the refrigerant can vaporize under ambient temperature to absorb the available heat energy, thus providing a cooling effect to a confined cooling circuit. With a similar heat pump device as located in the condenser 102, the heat exchanger 105 according to the present invention can also be applied in the evaporator 103. In this case, the refrigerant vapour enters the heat exchanger 105 via the duct 151 or 152. The nanofluid of the coolant circle enters the heat exchanger 105 parallel with or counter-flow with the evaporating loop. In the evaporating loop, the refrigerant (which is under reduced pressure) will be vaporized upon absorption of considerable amount of thermal energy from ambient represented by the nanofiller-enhanced coolant in the coolant circle. Due to the increased thermal capacitance of nanofillers in the refrigerating solution, the amount of energy absorbed is greater than that in the absence of a nanofluid. After evaporation, the refrigerant vapour will enter an absorber 104 for absorption, whereas the nanofluid will be recollected at the other loop and will eventually flow back the loop, consuming the chilling energy.

When the refrigerant vapour with high intrinsic energy enters the absorber 104, such will be absorbed into the absorbent (poor working) solution serving as the base fluid of the nanofiller fluid matrix in the absorber 104. The dissolution of refrigerant vapour into the absorbent solution will release thermal energy required to be dissipated away immediately. This can be accelerated by using the nanofiller synthesized solution. The thermal energy will be received more efficiently and effectively by the higher thermal conductivity of such nanofillers in the working solution and passed on to the heat exchanger, whose external re-cooling loop may have the same configuration as the heat exchanger 105, and the heat can be transmitted away via another nanofluid in the outside re-cooling loop of the heat exchanger 105 connected to the external heat sink or cooling towers. Similarly, the heat exchanger 105 is also one of the key parts in the absorber 104.

As shown in FIG. 15, the high thermal energy working fluid flow via duct 151 to absorber 104, the nanofluid with high thermal capacitance will assist in dissipate the thermal energy to an external heat sink or cooling towers. For that working fluid still with incomplete heat dissipation, it will re-loop with the duct 152 for the secondary heat dissipation. While those working fluid with complete heat dissipation, it will flow out of the absorber 104 via duct 150 and will eventually enter into the desorber 101 again for continuous recycling.

It can therefore be seen that the heat exchanger 105 can be used in each of the desorber 101, the condenser 102, the evaporator 103 and the absorber 104 discussed above.

In the device according to the present invention, a heat transporting medium in fluid form, e.g. liquid form, (and called "nanofluid"), is contained in a duct of the device for movement for transferring thermal energy between a zone of elevated temperature and a zone of reduced temperature. The nanofluid is a fluid matrix composed of thermally conductive solid nanofillers in a base fluid, e.g. a liquid. The base fluid may be water, organic, inorganic, organo-metallic, polymeric and may be single species or in different combinations.

The fluid matrix should have the following physical and chemical properties, namely, low vapor pressure, high boiling point, high specific heat capacity, low thermal expansion and good wetting with the thermal conductive nanofiller. The wetting between the thermal conductive nanofillers and the matrix is extremely critical and determines the thermal property of the nano-fluid. These thermally conductive nanofiller materials must have excellent thermal conductivity (at least one dimension having a thermal conductivity of more than 150 W/mK; e.g. corresponding to materials like AlN, Al, Ag, Cu, nanographites and diamond), and are well-dispersed in the fluid by mechanical mixing, shearing or planetary mixing. Such thermal conductive nanofillers can be organic, inorganic, organo-metallic, polymeric and they can be single species or in different combinations. The content of the nanofiller is variable, from 0.1 vol. % to 20 vol. %, and with a viscosity ranging from 1-5000 mPa·s, where the concentration affects the thermal resistance/thermal conductivity of the nanofluid. As the thermal conductive fillers are nano-scaled, their surface area increases. Excellent heat conduction can only be realized by good dispersion of the nanofillers in the base liquid. For good dispersion, physical or chemical treatment may be applied on the nanomaterials.

Nanomaterials with high aspect ratios and tubular structure have been chosen as the thermally conductive fillers. Nanomaterials are first functionalized and activated, to prepare their surfaces for further manipulations. After the completion of proper reactions, the finished product can be easily dissolved or dispersed in an aqueous or liquid medium. To demonstrate an illustrative example, we choose a chemical reaction by reacting with hydroxyl-containing organic molecules, such as an organic hydrocarbon with two or more hydroxyl groups. These hydroxyl groups may bond to one particular carbon atom or different carbon atom within the molecule. There are no particular restrictions on the molecular structure of such organic hydrocarbon, provided it is liquid at 25° C., with low vapor pressure, high boiling point branched and straight chains with partial branchings. The hydrocarbons may contain 2 to 50, and preferably 4 to 20, carbon atoms. In addition to the presence of hydroxyl groups, other functional groups such as alkenyl, alkyl, carbonyl, amino, carboxylic, siloxane are also preferred. In addition to the aforesaid hydrocarbons, other chemicals which may be cross-linking agent, dissolution agent, additional stabilizers, surfactants, catalysts or chemicals which can assist the dispersion of the nanomaterials, enhance the thermal conductivity of the nanofluid, or induce further reaction with the organic hydrocarbon, may also be added. Appropriate nanofiller may be solid carbon nanotubes (CNTs). Preferably, at least one dimension of the carbon nanotube is less than 100 nm in diameter, and at least one dimension of the carbon nanotube has a thermal conductivity of over 150 W/mk, e.g. up to 3,500 W/mk.

Materials

All chemicals mentioned herein were purchased from Aldrich online unless otherwise specified and they are readily used as received unless otherwise specified. Dichloromethane (DCM) were dried over molecular sieves and distilled over calcium hydride. Pristine nanomaterials were used as received. To illustrate a comparative method herein, PEG 100, PEG 200, PEG 300 and PEG 400, each being a commonly available polyethylene glycol, have been used as a respective base fluid.

Characterization

Thermogravimetric analysis was performed on a Perkin Elmer TGA 7 under nitrogen at a heating rate of 10° C./min. FT-IR spectra were recorded using a Perkin Elmer 16 PC FT-IR spectrophotometer. TEM images were obtained using a JEOL 2010F instrument operating at 200 kV. Particle size distribution was measured using Coulter LS230. Thermal resistance was measured by using a conventional experimental set-up.

Synthesis

Into a round-bottom flask equipped with a septum and a magnetic stirrer bar was added 0.3 g of solid carbon nanotubes (being a nanomaterial). The system was then stirred in 100 ml of a mixture of concentrated sulfuric acid and nitric acid at room temperature for 1 day. The resulting mixtures were diluted with deionized water and filtered off. The products were washed thoroughly with deionized water and dried in vacuum overnight at 40° C. Black powder was isolated in 99% yield (0.298 g). IR (thin film), ν (cm$^{-1}$): 1716 (C=O stretching).

Into a 500 ml two-necked flask equipped with a septum and a magnetic stirrer bar were added 0.3 g of the black powder as mentioned above and 300 ml of freshly distilled DCM. 1 g of PEG 100 dissolved in 25 mL of distilled DCM was added via a dropping funnel. The mixture was refluxed under nitrogen at 120° C. for 48 hours. After cooling down to room temperature, the mixture was centrifuged at 4500 rpm and a clear DCM layer was separated. Purification of the hybrid so formed was done by repeatedly washing the crude product with DCM and subsequent centrifuging the mixture to remove the supernatant. Black powder of PEG 100 hybrids was isolated in 24.6% yield (0.319 g). IR (thin film), ν (cm$^{-1}$): 1093. (C—O-stretching), 1451.9 (CH$_2$ ending), 1584.1 (=C stretching), 1731.9 (C=O stretching), 2873 (C—H stretching). For enhancing its performance, the nanofiller may also be coated with at least one metallic catalyst.

By reacting carbon nanotubes with different chemicals (PEG 100, PEG 200, PEG 300 and PEG 400) but subject to the same reaction media, different functionalized hybrids were synthesized. Indeed, the surface modification or functionalization can be nourished by laser ablation or any other physical means. Chemical modification is thus only used as an example.

To determine the thermal stability and flexible-chain of the hybrids, thermogravimetric analysis (TGA) was adopted. Pristine reactant (i.e. non-pretreated reactant) is extremely stable, losing only a tiny portion of its weight when heated to 800° C. On the other hand, the reacted hybrids start to degrade at round 200° C. This is understandable because the hybrids generally show low resistance to thermolysis. Table 1 below shows the percentage loss of weight of the synthesized hybrids as compared with non-synthesized reactant.

TABLE 1

| | Amount of loss of weight of reactants | | | | |
|---|---|---|---|---|---|
| | Hybrid of PEG 100 | Hybrid of PEG 200 | Hybrid of PEG 300 | Hybrid of PEG 400 | Non-Synthesized Reactant |
| Amount of flexible chain grafted (wt %)$^a$ | 6.7 | 11.0 | 15.0 | 12.3 | 0 |

$^a$Calculated from the TGA data at 400° C.

Figure 17:
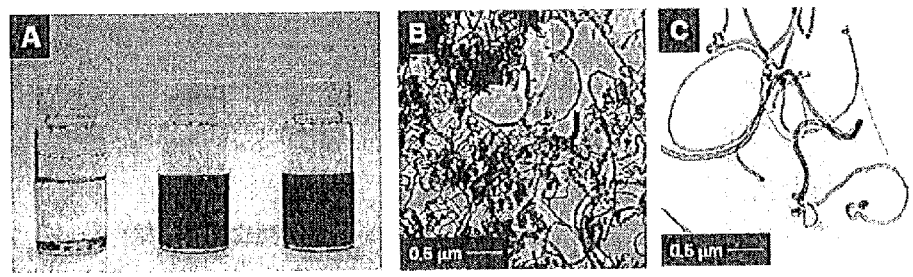
FIG. 17 shows examples of nanofluids and presence of nanofillers by transmission electron microscopy (TEM)

To check whether the modification of the nanomaterials of the pristine reactants to hybrids has helped to improve its dispersion, 0.1 wt % of PEG 300 and PEG 400 hybrids were added in deionized water, the mixtures were ultrasonicated for 1 hour. After sedimentation and purification, a homogenous solution was extracted. The nanofluids, namely hybrid PEG 300 and PEG 400, were stable for more than six months. Remarkably, the black solutions remained homogenous and unchanged. Photographs of aqueous solutions of PEG 300 and PEG 400 are shown in FIG. 17. In sharp contrast, the pristine sample without any treatment was poorly dispersed, and started to settle at the bottom of the vial after 30 minutes. The viscosity of the resulting hybrid nanofluids of PEG 100, PEG 200, PEG 300 and PEG 400 measured were less than 500 mPa·s.

Figure 18:
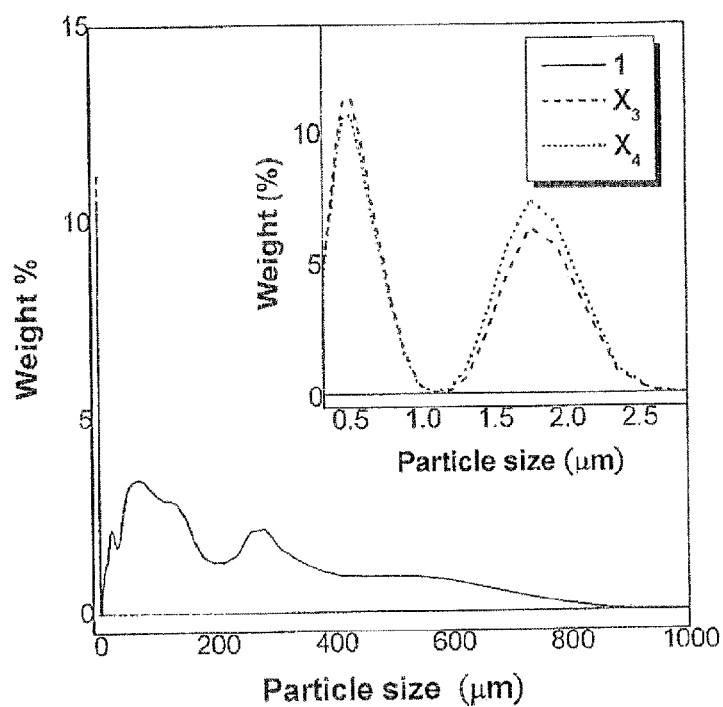
FIG. 18 shows experimental results on the small particle size of nanofillers in the nanofluids.

The particle sizes of the supernatant in hybrids PEG 100, PEG 200, PEG 300 and PEG 400 were checked on a monthly basis. It was found that the size distributions had varied little within six months, which means that no re-agglomeration was observed after ultrasonication. There was an encouraging result of the stability of the solution after six months of storage at room temperature, as shown in FIG. 18. The particle sizes of the hybrid PEG 300 and PEG 400 ranged from 0.4 to 2.5 µm, whereas those of the untreated pristine reactant ranged from 10 to 800 µm, all dissipated in deionized water. This result explains why the pre-treated PEG 300 and PEG 400 can stay dispersed homogenously for more than six months although their sizes are very small. TEM analysis gives a clearer picture about the morphology of the composites. As indicated FIG. 17, many clusters were observed in the TEM image of the untreated pristine reactant (labeled as "1"), suggesting poor dispersion. In contrast, and as shown in FIG. 18, treated hybrid PEG 300 (labeled as X$_3$) and treated hybrid 400 (labeled as X$_4$) give discrete structures in which nanofillers are well dispersed and separated from each other.

Thermal Properties

The thermal resistance of the untreated pristine reactant and the hybrids PEG 100, PEG 200, PEG 300, PEG 400 were tested by mixing around 15 wt. % of nanofillers in alcohol. Measurement of the thermal resistance was done by using a conventional method by sandwiching the nanofluid between two well-polished thermo couples. Under a power of around 160.8 W, the temperature difference of the thermocouples was measured. The measured value was then divided by the power, to arrive at the thermal resistance. The resulting viscosity was found to be lower than 3000 mPa·s.

As shown in Table 2 below, the thermal resistance of the hybrid PEG 100, PEG 200, PEG 300, PEG 400, interestingly, shows lower resistance, with the difference as large as 14%. This can be explained as resulting from better dispersion of nanofillers in the matrices and thus heat is efficiently conducted along the axial direction. In addition, due to the pronounced improvement in dispersion, the contact between nanomaterials is greatly improved. As shown in FIG. 17, the untreated pristine reactant shows highly agglomerated nanomaterial clusters, with sizes ranging from 10 to 800 μm. The network of nanotubes is limited and heat cannot be effectively transferred. In contrast, the particle sizes of its derivatives, namely hybrid PEG 100, PEG 200, PEG 300 and PEG 400, are much smaller (in the order of 0.4 to 2.5 μm). Discrete nano material is found to disperse well in matrices, thus allowing a wide process window for heat conduction.

TABLE 2

The Thermal Resistance of untreated pristine reactant (labeled as "X"), treated hybrid PEG 100 (labeled as "$X_1$"), treated hybrid PEG 200 (labeled as "$X_2$"), treated hybrid PEG 300 (labeled as "$X_3$"), and treated hybrid PEG 400 (labeled as "$X_4$").

| Sample[a] | Thermal Resistance[b] (K/W) | Improvement (%) |
|---|---|---|
| X | 0.01862 | 0 |
| $X_1$ | 0.01740 | 7 |
| $X_2$ | 0.01709 | 9 |
| $X_3$ | 0.01648 | 13 |
| $X_4$ | 0.01628 | 14.3 |

[a]15 wt % of samples were dispersed in.
[b]Measurements were taken at 160.8 W after 15 minute observation.

The above example broadly demonstrates the importance of this invention, the outstanding performance of nanofluid, which acts as a heat transporting medium, in heat dissipation, and assists better understanding of the mechanism of this invention. Of course, the molecular structure, chemicals, chemical treatment method used above are only for the purpose of demonstration, and therefore the scope of this invention should not be unduly restricted.

A usual problem associated with the design of heat exchange devices is the requirement of increasing the surface area of the heat transfer surface to increase the rate of heat exchange between a zone of elevated temperature and a zone of reduced temperature by geometrical means. However, very little effort has been spent on increasing the ratio of the surface area of the solid content in the heat transporting medium to the area of the zone separating surfaces. This effort has also been hampered by the size and corrosion effect of additives in the fluid.

According to the present invention, it is possible to select nanomaterials with no significant chemical or physical corrosive effect even at increased flow rates, e.g. carbon nanotubes as discussed above. Such nanomaterials can significantly increase the ratio of the area of the effective (solid) fluid surface ($A_{fl}$) to the area of the enclosing surface of a duct or heat exchange chamber ($A_{ex}$), i.e.

$$\frac{A_{fl}}{A_{ex}}.$$

For heat exchanger with the state of art, the value of the $A_{fl}$ equals to the wetted surface of the heat exchanger with liquid. To illustrate an example with cylindrical type, the value of $A_{fl}$ will be $2\pi RL$, where L is the length of duct and it would have the same value of $A_{ex}$. Therefore, the value of $A_{fl}/A_{ex}$ for a traditional cylindrical type of heat exchanger would be close to 1, assuming that the duct is filled up with liquid. Even for the engineering of the geometries of the heat exchanger, only the $A_{ex}$ will be changed and indeed, the ratio $A_{fl}/A_{ex}$ will be less than 1 accordingly.

However, with the addition of the nanofillers, the value of $A_{fl} = \pi R^2 L \cdot BET \cdot \rho \cdot vol.$ %, which is measured by nitrogen absorption for 100 vol. %, where $\rho$ is the density of the nanofluid, and BET is the measured surface area of the sold nanofiller in the nanofluid. Thus:

$$\frac{A_{fl}}{A_{ex}} = (\pi R^2 L \cdot BET \cdot \rho \cdot vol\ \%)/2\pi RL$$

$$= \frac{BET \cdot \rho \cdot R}{2} \cdot vol.\ \%$$

For a first kind of nanofluid which may be used in the present invention, using 1 vol. % of CNT with a BET value of 100 m$^2$/g and a density of 1.3 g/cm$^3$ in a cylinder of a radius of 10 cm, the value of $$\frac{A_{fl}}{A_{ex}}$$

is 6,500,000 (i.e. 6.5×10$^6$). Further examples of the value of $$\frac{A_{fl}}{A_{ex}}$$

are shown in Table 3 below.

TABLE 3

Examples of $\frac{A_{fl}}{A_{ex}}$ of a heat exchanger according to the present invention

| Vol % | BET (m$^2$/g) | Density (g/m$^3$) | Radius of duct (m) | $\frac{A_{fl}}{A_{ex}}$ |
|---|---|---|---|---|
| 1 | 100 | 1.3 * 10$^6$ | 0.0003 | 19,500 |
| 1 | 100 | 1.3 * 10$^6$ | 0.003 | 195,000 |
| 1 | 65 | 1.3 * 10$^6$ | 0.1 | 4,225,000 |
| 1 | 100 | 1.3 * 10$^6$ | 0.1 | 6,500,000 |
| 1 | 100 | 1.3 * 10$^6$ | 0.03 | 1,950,000 |
| 1 | 100 | 1.3 * 10$^6$ | 0.0001 | 6,500 |
| 0.1 | 100 | 1.3 * 10$^6$ | 0.0001 | 650 |
| 0.01 | 100 | 1.3 * 10$^6$ | 0.0001 | 65 |

It is to be noted that although the term duct is used, the duct is actually a passageway providing a heat exchange surface. The duct may not be circular and it may have a rectangular cross section. It is thus to be understood that $A_{ex}$ refers to the area of the heat exchange surface.

TABLE 4

Correlation of $\frac{A_{fl}}{A_{ex}}$ and improvement of heat transfer (%)

| $A_{fl}/A_{ex}$ | improvement (%) |
|---|---|
| 33 | 0.92 |
| 98 | 3.4 |
| 163 | 5.7 |
| 325 | 10 |
| 1,625 | >10 |
| 3,250 | >10 |
| 26,000 | >10 |

As can be shown from the above table, a $$\frac{A_{fl}}{A_{ex}}$$

value of about 100 can improve efficiency of heat exchange by over 3% which is practically significant. A $$\frac{A_{fl}}{A_{ex}}$$

value of about 325 or more can dramatically improve the efficiency by 10% or more.

In order to better work the present invention, the viscosity, density and flow rate of the nanofluid and thermal conductivity of the nanofillers are carefully chosen, so as to achieve better performance of the device.

According to our research, it is found that the viscosities of such nanofluids which are suitable for use in the present invention are as follows:

TABLE 5

Examples of viscosity of nanofluids suitable for use in the present invention

| PEG 200 (vol. %) | CNT (vol. %) | Viscosity (mPa · s) |
|---|---|---|
| 95 | 0.1 | 500 |
| 85 | 15 | 3,000 |
| 80 | 20 | 5,000 |

It can be seen that the viscosity of such nanofluids may range from 500 to 5,000.

In fluidic mechanics, the Reynolds number ($R_e$) is a dimensionless number which measures the ratio of inertial forces to viscous forces and thus correspondingly quantifies the given flow conditions.

It is common wisdom that:

$$R_e = \rho V L/\mu;$$

where $\rho$ is the density of the fluid,
V is the volume of the fluid,
L is the diameter of pipe, and
$\mu$ is the dynamic viscosity of the fluid.

Reynolds numbers are important for dimensional analysis of fluid dynamics problems, and they are also used for characterizing different flow regimes, such as laminar or turbulent flow. Laminar flow occurs at low Reynolds numbers, where viscous forces are dominant, and is characterized by smooth, constant fluid motion, while turbulent flow occurs at high Reynolds numbers and is dominated by inertial forces, which tend to produce random eddies, vortices and other flow instabilities.

In achieving the best heat-exchanging capability, good understanding of device dimensions and the materials engineering is necessary and should be optimized by repetitive optimizations and experiments, for example the diameters of the duct 51 and 52, the pressure inside the ducts and the flow speeds relate to the enthalpy of working solutions should be well-understood because they affect the heat exchange performance.

It is found that, to better work the present invention, the flow of the nanofluid in the duct of the device should be laminar. Taking PEG 200 as the fluid carrier dispersed with CNT of different volume percentages, and in a heat exchanger with pipe radius of 0.1 m, various scenarios of flow conditions are summarized in Table 6 below.

TABLE 6

Reynolds Numbers of Different Flow Conditions

| | Scenario 1 | Scenario 2 | Scenario 3 | Scenario 4 |
|---|---|---|---|---|
| Density (g/cm$^3$) | 1.0 | 1.3 | 1.3 | 1.3 |
| Flow speed (m/s) | 10 | 5 | 5 | 5 |
| Pipe diameter (m) | 0.2 | 0.2 | 0.2 | 0.2 |
| Viscosity (Ns/m$^2$) | 0.06 | 0.5 | 3 | 5 |
| Carbon nanotubes (vol. %) | 0 | 0.1 | 15 | 20 |
| Reynolds Number (Re) | 33,333 | 2,600 | 433 | 260 |
| Flow pattern | Turbulent | Laminar | Laminar | Laminar |

For Scenario 1, in which there was no nanofiller (i.e. CNT) in the heat transporting fluid in the pipe, the speed of flow of the fluid was increased to achieve similar heat exchange performance.

It is found that in a device constructed according to the present invention making using of such nano-fluid, the heat transfer capability can be improved by a factor of 2, by considering the same pressure drop across the inlet and outlet. Due to the high thermal capacitance of carbon nanofibers, the heat transfer capability can be increased without seriously hampering viscosity and the corresponding flow rate of fluid can be even slower.

Although the invention has thus far been mainly described in the context of heat exchangers, the invention is also applicable in a device for use in dual phase absorption/desorption processes. In particular, in such an application, the heat transporting working medium contains or accommodates a gas, e.g. hydrogen, in dissolved or chemically bound form. By way of such an arrangement, the device can release the gas, i.e. hydrogen, by introducing thermal energy; from solar heat, combustion or waste energy.

It should be understood that the above only illustrates an example whereby the present invention may be carried out, and that various modifications and/or alterations may be made thereto without departing from the spirit of the invention. It should also be understood that various features of the invention which are, for brevity, described in the context of a single embodiment, may also be provided separately or in any appropriate sub-combinations. The prior art mentioned in the description is incorporated in its entirety.

The invention claimed is:
1. A heat transfer device comprising:—(a) a first heat transfer member defining a heat exchange surface with which a heat transportable medium contacts in use and via which heat is transferable between the heat transportable medium and a working medium; and
  (b) a device body for containing the heat transportable medium;
  wherein:—
    (i) said body defines at least a first chamber, a second chamber and a third chamber which are in fluid communicable relationship;
    (ii) said body is configured to allow the heat transportable medium to pass from said second chamber to said first chamber and then to said third chamber, or from said third chamber to said first chamber and then to said second chamber; and
    (iii) said second chamber is sandwiched or otherwise positioned between said first chamber and said third chamber in said body.

2. The device as claimed in claim 1, wherein said body is provided with a first passageway allowing the heat transportable medium to enter or exit said second chamber, and a second passageway allowing the heat transportable medium to enter or exit said third chamber.

3. The device as claimed in claim 2, wherein said first passageway is an outlet allowing the heat transportable medium to exit said body while said second passageway is an inlet allowing the heat transportable medium to enter said body or vice versa.

4. The device as claimed in claim 1, wherein said heat transfer member is in direct contact with or part of said first chamber such that heat transfer between said heat transfer member and said first chamber can take place, but not in direct contact with said second chamber.

5. The device as claimed in claim 1, wherein said body is provided with channels allowing the heat transportable medium to pass from said first chamber to said second chamber or vice versa.

6. The device as claimed in claim 1, wherein said body is provided with channels allowing the heat transportable medium to pass from said first chamber to said third chamber or vice versa.

7. The device as claimed in claim 1, wherein at least one of said chambers is made of at least a pair of oppositely facing plates generally arranged in parallel to each other.

8. The device as claimed in claim 1, wherein said first chamber and said second chamber are separated by a plate at which a plurality of openings are provided and generally evenly distributed, allowing the heat transportable medium to pass from said first chamber to said second chamber or vice versa.

9. The device as claimed in claim 1, wherein said first chamber and said third chamber are separated by said second chamber at which a plurality of channels are provided and generally evenly distributed, allowing heat transportable medium to bypass said second chamber and pass from said first chamber to said third chamber or vice versa.

10. The device as claimed in claim 1, wherein said body includes means for regulating flow direction of the heat transportable medium entering or exiting said first chamber, said second chamber or said third chamber.

11. The device as claimed in claim 1, wherein:—(a) said body further defines a fourth chamber, a fifth chamber and a sixth chamber which are in fluid communicable relationship;
  (b) said body is configured to allow the heat transportable medium to pass from said fifth chamber to said fourth chamber and then to said sixth chamber, or from said sixth chamber to said fourth chamber and then to said fifth chamber; and
  (c) said fifth chamber is sandwiched or otherwise positioned between said fourth chamber and said sixth chamber.

12. The device as claimed in claim 1, further comprising a second heat transfer member defining a heat exchange surface with which a heat transportable medium contacts in use and via which heat is transferable between the heat transportable medium and a working medium, wherein:—(a) said body further defines a fourth chamber and a fifth chamber which together with said third chamber are in fluid communicable relationship;
  (b) said body is configured to allow the heat transportable medium to pass from said fourth chamber to said fifth chamber and then to said third chamber, or from said third chamber to said fifth chamber and then to said fourth chamber; and
  (c) said fourth chamber is sandwiched or otherwise positioned between said third chamber and said fifth chamber.

13. The device as claimed in claim 1, further comprising a heat transporting medium including a base fluid and a solid nanofiller, wherein $$\frac{\text{surface area of the solid } nanofiller \ (AA)}{\text{area of the heat exchange surface } (Aex)}$$

is above 100.

14. A heat transfer device for exchange of thermal energy between zones of elevated and reduced temperature, comprising:—
  (a) a heat transportable medium;
  (b) a device body to contain the heat transportable medium; and
  (c) a heat transfer member;
  wherein:—(i) said body is configured to allow the heat transportable medium to move between said zones of elevated and reduced temperature;
    (ii) said heat transfer member defines a heat exchange surface with which the heat transportable medium contacts in use and via which heat is transferable between the heat transportable medium at one side of said heat transfer member and a working medium at opposite side of said heat transfer member;
    (iii) said heat transportable medium includes a base fluid and a solid nanofiller; and $$\frac{\text{surface area of the solid } nanofiller \ (AA)}{\text{area of the heat exchange surface } (Aex)}$$

is above 100.

15. The device according to claim 14, wherein the viscosity of said heat transportable medium is from 1 to 5,000 mPa-s.

16. The device according to claim 14, wherein at least one dimension of said solid nano filler has a thermal conductivity of more than 150 W/m.

17. A heat transfer device assembly comprising at least two said heat transfer devices as claimed in claim 1.

18. A heat exchanger comprising a heat transfer device as claimed in claim 1, or a heat transfer device assembly as claimed in claim 17.

19. A method of manufacturing a heat transfer device, comprising:—
  (a) providing a device body having at least a first wall, a second wall, a third wall and a fourth wall arranged in a layered manner such that a first cavity is defined between said first wall and said second wall, a second cavity is defined between said second wall and a third cavity is defined between said third wall and said fourth wall, and the second cavity is sandwiched or otherwise positioned between said first cavity or said third cavity;

(b) providing said walls with channels such that the first cavity, the second cavity and the third cavity are in fluid communicable relationship; and (c) providing said device body with a first passageway allowing fluid to enter or exit the second cavity and a second passageway, and a second passageway allowing fluid to enter or exit the third cavity, such that fluid can pass enter said device body firstly into the second cavity, secondly into the first cavity and thirdly into the third cavity and then exiting said device body, or firstly into the third cavity, secondly into the first cavity and thirdly into the second cavity and then exiting said device body.

20. The method as claimed in claim 16, comprising prefabricating at least one of said walls.

* * * * *